US012611776B2

(12) United States Patent
Park et al.

(10) Patent No.: US 12,611,776 B2
(45) Date of Patent: Apr. 28, 2026

(54) MULTIPLE HYDRAULIC ROBOT SYSTEM FOR PRECISELY MOUNTING GIRDER

(71) Applicant: KOREA INSTITUTE OF ROBOT AND CONVERGENCE, Pohang-si (KR)

(72) Inventors: Jeong Woo Park, Busan (KR); Hyogon Kim, Goseong-gun (KR); Hyojun Lee, Pohang-si (KR); Jong Chan Kim, Pohang-si (KR); Kyoungseok Noh, Pohang-si (KR); Young Ho Choi, Pohang-si (KR); Jeong Hwan Hwang, Pohang-si (KR); Ji Hyun Park, Pohang-si (KR)

(73) Assignee: KOREA INSTITUTE OF ROBOT AND CONVERGENCE, Pohang-si (KR)

( * ) Notice: Subject to any disclaimer, the term of this patent is extended or adjusted under 35 U.S.C. 154(b) by 827 days.

(21) Appl. No.: 17/922,490

(22) PCT Filed: Jan. 11, 2021

(86) PCT No.: PCT/KR2021/000328
§ 371 (c)(1),
(2) Date: Oct. 31, 2022

(87) PCT Pub. No.: WO2022/114385
PCT Pub. Date: Jun. 2, 2022

(65) Prior Publication Data
US 2023/0191609 A1 Jun. 22, 2023

(30) Foreign Application Priority Data
Nov. 26, 2020 (KR) ........................ 10-2020-0161332

(51) Int. Cl.
*B25J 9/16* (2006.01)
*B25J 9/14* (2006.01)

(52) U.S. Cl.
CPC ............... *B25J 9/1682* (2013.01); *B25J 9/14* (2013.01); *B25J 9/1615* (2013.01); *B25J 9/1669* (2013.01)

(58) Field of Classification Search
CPC ......... E01D 21/00; E01D 21/08; E01D 21/10; E01D 21/105; B25J 9/1682; B25J 9/14; B25J 9/1615; B25J 9/1669; B25J 9/009
See application file for complete search history.

(56) References Cited

U.S. PATENT DOCUMENTS 5,511,268 A * 4/1996 Albus ..................... E01D 21/06
212/312
8,166,596 B2 * 5/2012 Kang ...................... E01D 21/06
14/77.1
(Continued)

FOREIGN PATENT DOCUMENTS

CN 201351084 Y 11/2009
CN 104354157 A 2/2015
(Continued)

OTHER PUBLICATIONS

International Search Report issued for PCT/KR2021/000328, dated Aug. 12, 2021.
(Continued)

*Primary Examiner* — Patrick H Mackey
(74) *Attorney, Agent, or Firm* — Westman, Champlin & Koehler, P.A.; Amanda M. Prose

(57) ABSTRACT

A multiple hydraulic robot system for precisely installing a girder according to the present disclosure may comprise: four hydraulic robots connected to both sides of two connection plates which are coupled to both ends of the top surface of a girder installed between bridge piers and to
(Continued)

which cables of a crane are connected, wherein the robots move the girder horizontally and vertically; a hydraulic system for operating actuators of the four hydraulic robots; and a controller which controls the remotely operated four hydraulic robots by means of a synchronization control algorithm to precisely adjust the installing position of the girder.

11 Claims, 11 Drawing Sheets

(56) References Cited

U.S. PATENT DOCUMENTS

| | | | | |
|---|---|---|---|---|
| 8,595,879 | B2 * | 12/2013 | Capolupo | E01D 21/00 |
| | | | | 414/10 |
| 8,671,490 | B1 * | 3/2014 | Carney | E01D 22/00 |
| | | | | 14/2.4 |
| 9,014,836 | B2 * | 4/2015 | Stone | G05B 19/41895 |
| | | | | 29/897 |
| 10,214,395 | B2 * | 2/2019 | Pan | B66C 19/00 |
| 2017/0226756 | A1 | 8/2017 | Hyvonen et al. | |
| 2023/0166402 | A1 * | 6/2023 | Terasaka | B25J 9/1682 |
| | | | | 700/248 |

FOREIGN PATENT DOCUMENTS

| | | | | | |
|---|---|---|---|---|---|
| JP | 2003170375 | A | | 6/2003 | |
| JP | 2006283324 | A | | 10/2006 | |
| KR | 20-0227594 | Y1 | | 6/2001 | |
| KR | 10-2009-0067973 | A | | 6/2009 | |
| KR | 10-2012-018696 | A | | 10/2012 | |
| KR | 101327824 | B1 | * | 12/2013 | ............ E01D 21/00 |
| KR | 10-1450229 | B1 | | 10/2014 | |
| KR | 10-1732457 | B1 | | 5/2017 | |
| KR | 101741762 | B1 | * | 6/2017 | ............ E01D 22/00 |
| KR | 10-2018-0107350 | A | | 10/2018 | |
| KR | 10-2072664 | B1 | | 2/2020 | |
| KR | 20250071618 | A | * | 5/2025 | ............ E01D 21/00 |
| WO | 1996005375 | A1 | | 2/1996 | |

OTHER PUBLICATIONS

Written Opinion of the International Searching Authority issued for PCT/KR2021/000328, dated Aug. 12, 2021.

Park, Jeong-Woo et al., "Development of Multiple Manipulation System for Precise Installation of Girder," Journal of Power System Engineering (2021) 25(6), 45-53. with English Abstract.

Notice of Allowance issued in related CN patent application serial No. 202180079358.6, dated Jul. 23, 2025.

* cited by examiner

1

MULTIPLE HYDRAULIC ROBOT SYSTEM FOR PRECISELY MOUNTING GIRDER

CROSS-REFERENCE TO RELATED APPLICATION

This Application is a Section 371 National Stage Application of International Application No. PCT/KR2021/000328 filed Jan. 11, 2021 and published as WO 2022/114385 A1 on Jun. 2, 2022, in Korean, which claims priority to KR patent application Serial No. 10-2020-0161332, filed Nov. 26, 2020, the contents of which are hereby incorporated by reference in their entirety.

BACKGROUND

Technical Field

The present disclosure relates to a multiple hydraulic robot system for precisely installing a girder. More specifically, the present disclosure relates to a multiple hydraulic robot system for precisely installing a girder, including a plurality of manipulator robots that are installed around a heavy girder and precisely move a girder position when the heavy girder is installed on a bridge pier using a crane.

Background Art

Installing a girder on a bridge pier at a bridge construction site requires a worker to climb on the high bridge pier and communicate with the crane that moves the girder and the worker has to install the girder while watching a target position directly next to the heavy girder. Accordingly, safety of the worker is very poor.

In general, installing the girder on the bridge pier including the following steps. First, two cranes connect both ends of the girder on the ground and move the girder to a target location on a bridge to be installed. Next, a worker on the bridge pier directly checks the girder and the target position, communicates with the crane, moves the girder slowly to the target position, and lowers the girder to install on the bridge pier. If necessary, before the girder is completely seated, the worker uses various tools to directly install the girder precisely. Since this work requires the worker to go up to the high-altitude site above the bridge pier and directly/indirectly handle heavy objects, safety is very poor.

Robot technology can be used to replace workers on a girder installing job site. However, since a size (about 50 m) of the girder is large and a weight (about 150 ton) thereof is heavy, it is impossible to work with a general manipulator robot.

SUMMARY

An object of the present disclosure is to provide a multiple hydraulic robot system for precisely installing a girder, including a plurality of manipulator robots that are installed around a heavy girder and precisely move a girder position when the heavy girder is installed on a bridge pier using a crane.

According to an aspect of the present disclosure, there is provided a multiple hydraulic robot system for precisely installing a girder, the multiple hydraulic robot system including: four hydraulic robots connected to both sides of two connection plates which are coupled to both ends of a top surface of a girder installed between bridge piers and to which cables of a crane are connected, two of the four hydraulic robots forming a pair and the robots moving the girder horizontally and vertically; a hydraulic system configured to operate actuators of the four hydraulic robots; and a controller configured to control the remotely operated four hydraulic robots by means of a synchronization control algorithm to precisely adjust the installing position of the girder.

The hydraulic robot may include a first horizontal actuator configured to move a first driving link rotatably coupled to one side of the connection plate, a second horizontal actuator configured to move a second driving link rotatably coupled to one side of the connection plate and rotatably connected to a side surface of the first horizontal actuator, a vertical actuator coupled to one end of the first horizontal actuator and moving up and down, a vertical shaft configured to guide an up-down movement of the vertical actuator, and a support rotatably coupled to a lower end of the vertical shaft.

The four hydraulic robots may precisely control the installing position of the girder with six degrees of freedom of movement in an x-axis, movement in a y-axis, yaw, movement in a z-axis, roll, and pitch.

The hydraulic system may include a hydraulic power unit configured to supply a flow rate in the hydraulic system, a hydraulic valve unit configured to individually supply flow rates to the actuators, and three hydraulic cylinders individually connected to the hydraulic valve unit.

The hydraulic power unit may include a pressure sensor and a flow sensor to have a flow control function by load sensing.

The hydraulic valve unit may support a load sensing function for loads of actuators, and further include a solenoid-based proportional directional control valve for precisely operating the actuator, and a relief valve configured to protect the hydraulic cylinder against external force under high load conditions.

In the hydraulic system, two systems may form a pair, and the hydraulic system may further include a valve unit for redundancy with load sensing connected between the pair of hydraulic valve units.

The valve unit for redundancy with load sensing may include an ON/OFF poppet valve connected to selectively share hydraulic supply lines of the pair of hydraulic valve units, a directional control valve configured to remotely activate or deactivate a redundancy function, and a shuttle valve and a check valve configured to selectively sharing a load sensing pressure according to ON/OFF of the ON/OFF poppet valve.

The controller may include a horizontal controller configured to control displacements of x, y, and $\theta z$ ($=$yaw) of the girder, and a vertical controller configured to control displacements of z, $\theta x$ ($=$roll), and $\theta y$ ($=$pitch) of the girder.

In the horizontal controller, a controller of a first hydraulic robot may calculate control values for the first horizontal actuator and the second horizontal actuator, a controller of a second hydraulic robot may receive status information of the first hydraulic robot as feedback and compensate for the robot position for synchronization to calculate control values for the first horizontal actuator and the second horizontal actuator, a controller of a third hydraulic robot may receive the status information of the first hydraulic robot and the second hydraulic robot as feedback and compensate for the robot position for synchronization to calculate control values for the first horizontal actuator and the second horizontal actuator, and a controller of a fourth hydraulic robot may receive the status information of the first hydraulic robot, the second hydraulic robot, and the third hydraulic robot as feedback and compensate for the robot position for synchronization to calculate the control values for the first horizontal actuator and the second horizontal actuator.

In the vertical controller, a controller of a first hydraulic robot may calculate a control value for the vertical actuator, a controller of a second hydraulic robot may receive status information of the first hydraulic robot as feedback and compensate for the robot position and force for synchronization to calculate the control value for the vertical actuator, a controller of a third hydraulic robot may receive status information of the first hydraulic robot and the second hydraulic robot as feedback and compensate for the robot position and force for synchronization to calculate the control value for the vertical actuator, and a controller of a fourth hydraulic robot may receive the status information of the first hydraulic robot, the second hydraulic robot, and the third hydraulic robot as feedback and compensate for the robot position and force for synchronization to calculate a control value for the vertical actuator.

ADVANTAGEOUS EFFECTS

According to the multiple hydraulic robot system for precisely installing a girder of the present disclosure, when a heavy girder is installed on a bridge pier using a crane, the multiple hydraulic robot system can be installed around the girder to precisely move the girder position.

In addition, by coupling a pair of connection plates to a girder top surface and installing a pair of outrigger-type manipulator hydraulic robots on both sides of each connection plate, the girder can be precisely moved and installed according to 6 degrees of freedom.

In addition, by applying a selective dual hydraulic system between the plurality of hydraulic robots, even when one hydraulic generating unit fails, the hydraulic pressure source can be supplied to the other hydraulic generating unit, and by disabling the valve unit for redundancy with load sensing, it is possible to precisely operate the plurality of hydraulic robots by minimizing the negative effects of the different load conditions of each hydraulic system.

Moreover, when controlling the actuators of each hydraulic robot, the controller of the present disclosure receives the status information of other hydraulic robots as feedback and compensates for the robot position and force for synchronization, and thus, the hydraulic robot can be controlled more precisely.

DESCRIPTION OF EXEMPLARY EMBODIMENTS

Figure 1:
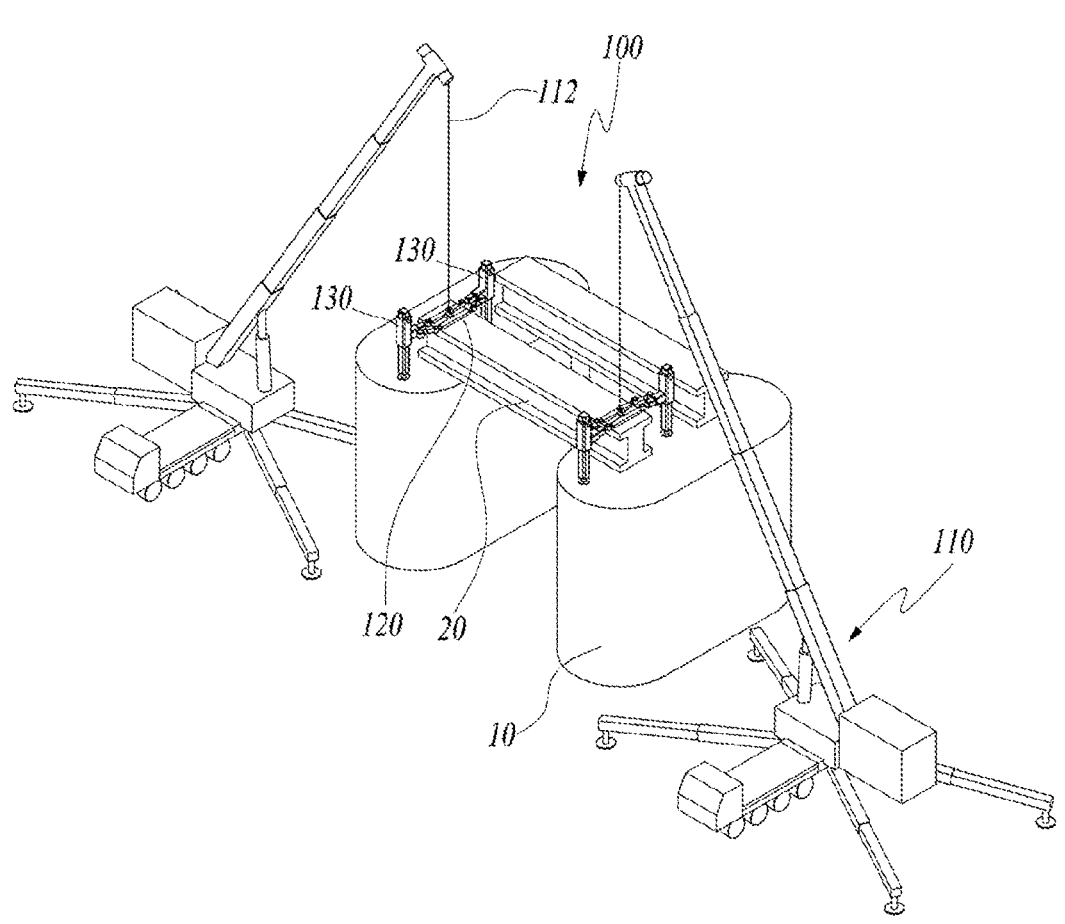
FIG. 1 is a perspective view illustrating a multiple hydraulic robot system for precisely installing a girder according to one embodiment of the present disclosure.

Since the present disclosure can apply various modifications and can have various embodiments, a specific embodiment is illustrated and described in detail in the detailed description. However, this is not intended to limit the present disclosure to a specific embodiment, and it should be understood to include all conversions, equivalents, or substitutes included in the spirit and scope of the present disclosure.

The terminology used in the present disclosure is only used to describe specific embodiments, and is not intended to limit the present disclosure. The singular expression includes the plural expression unless the context clearly dictates otherwise. In the present disclosure, terms such as "include" or "have" are intended to designate that a feature, number, step, action, component, part, or combination thereof described in the specification exists, but it should be understood that it does not preclude the possibility of addition or existence of one or more other features or numbers, steps, operations, components, parts, or combinations thereof.

Hereinafter, preferred embodiments of the present disclosure will be described in detail with reference to the accompanying drawings. In this case, it should be noted that in the accompanying drawings, the same components are denoted by the same reference numerals as much as possible. In addition, a detailed description of the notification function and configuration that may obscure the gist of the present disclosure will be omitted. For the same reason, some components are exaggerated, omitted, or schematically illustrated in the accompanying drawings.

Figure 2:
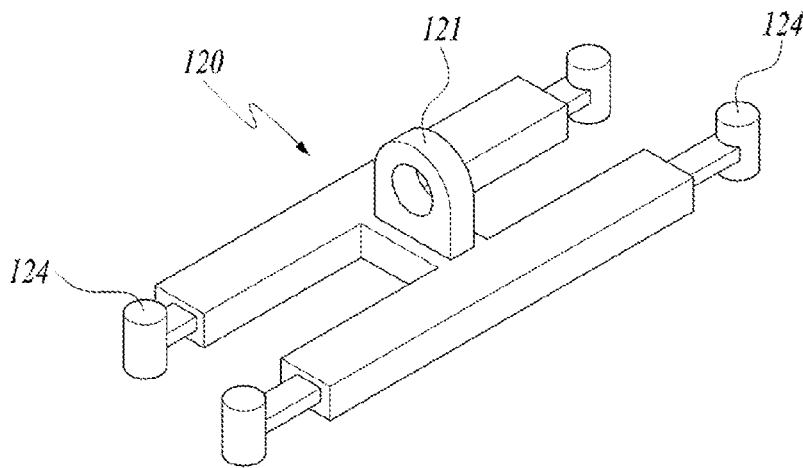
FIG. 2 is a perspective view illustrating a connection plate coupled to the girder.
Figure 3:
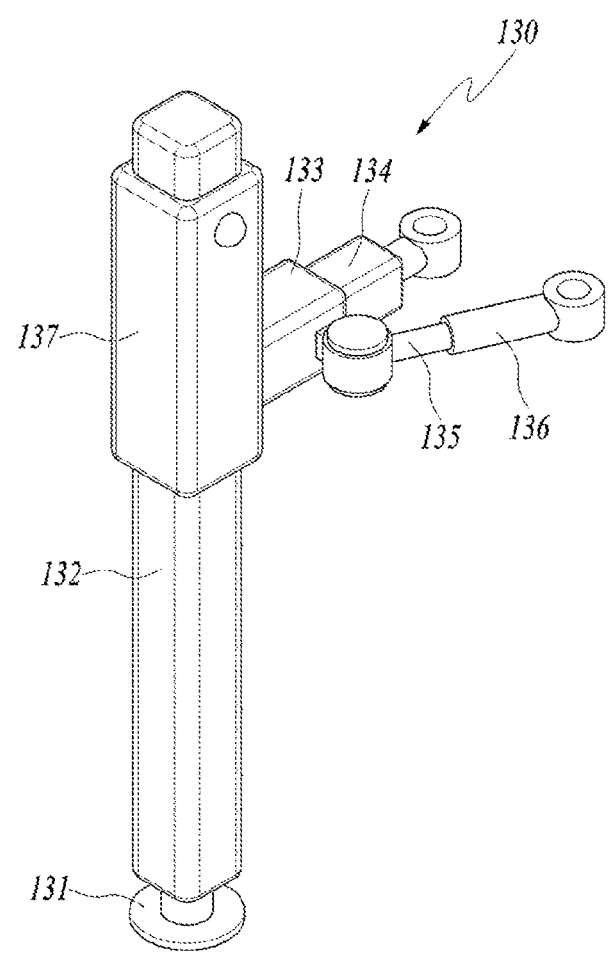
FIG. 3 is a perspective view illustrating a hydraulic robot coupled to both sides of the connection plate.
Figure 4:
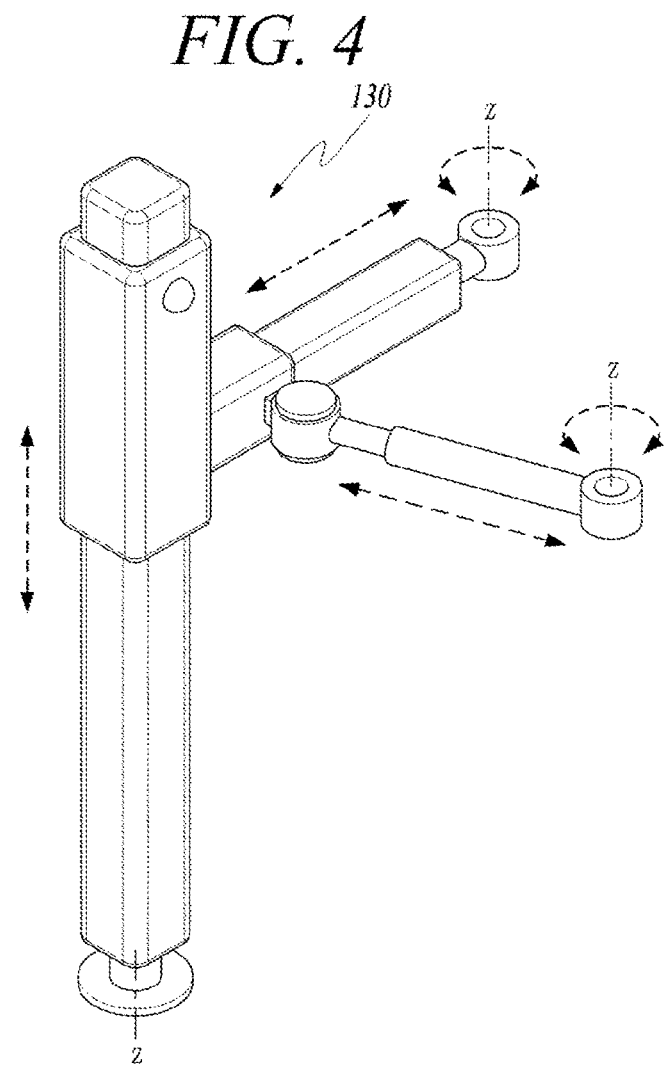
FIG. 4 is a perspective view illustrating that the hydraulic robot are driven by a vertical actuator and two horizontal actuators in the hydraulic robot of FIG. 3.
Figure 5:
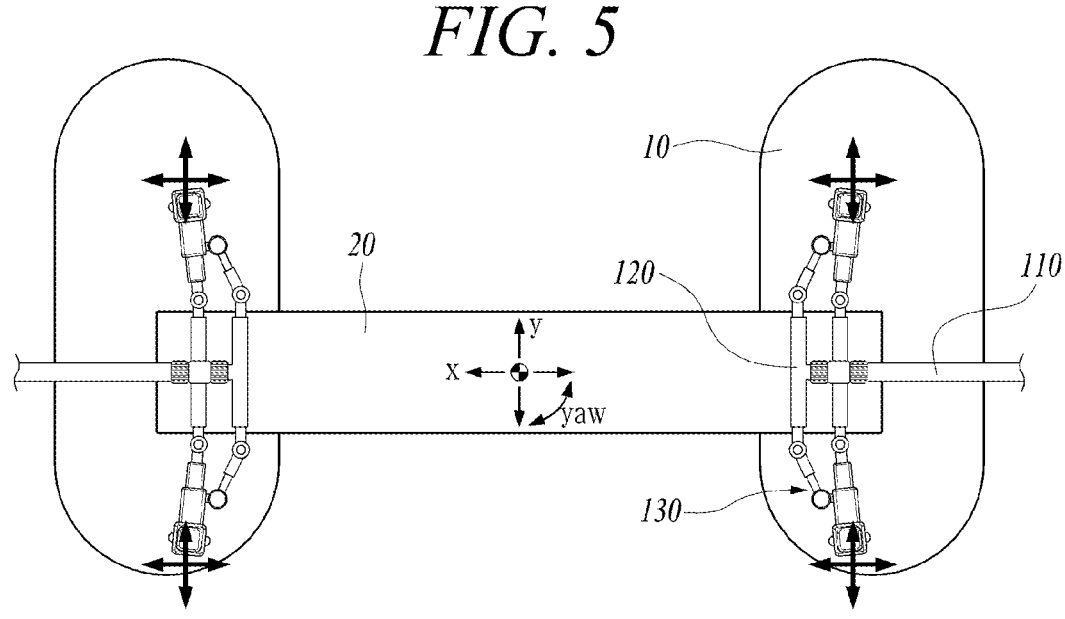
FIG. 5 is a top surface view illustrating four hydraulic robots moving the girder with three degrees of freedom in a horizontal direction.
Figure 6:
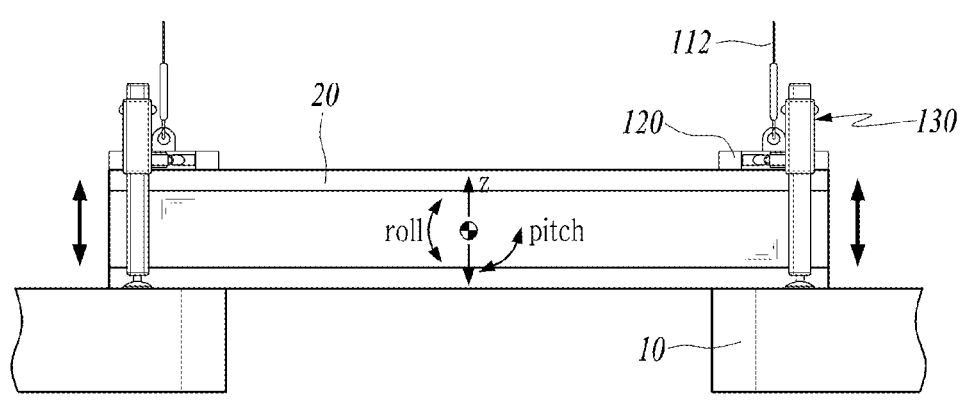
FIG. 6 is a side surface view illustrating four hydraulic robots moving the girder in the vertical direction with three degrees of freedom.

FIG. 1 is a perspective view illustrating a multiple hydraulic robot system for precisely installing a girder according to one embodiment of the present disclosure, FIG. 2 is a perspective view illustrating a connection plate coupled to the girder, FIG. 3 is a perspective view illustrating a hydraulic robot coupled to both sides of the connection plate, FIG. 4 is a perspective view illustrating that the hydraulic robot are driven by a vertical actuator and two horizontal actuators in the hydraulic robot of FIG. 3, FIG. 5 is a top surface view illustrating four hydraulic robots moving the girder with three degrees of freedom in a horizontal direction, and FIG. 6 is a side surface view illustrating four hydraulic robots moving the girder in the vertical direction with three degrees of freedom.

The multiple hydraulic robot system 100 for precisely installing a girder according to one embodiment includes two connection plates 120 which are coupled to both ends of a top surface of a girder 20 installed between bridge piers 10 and to which cables of a crane are connected, four hydraulic robots 130 connected to both sides of the two connection plates to move the girder horizontally and vertically, a hydraulic system 200 configured to operate actuators of the four hydraulic robots, and a controller 350 configured to control the remotely operated four hydraulic robots by means of a synchronization control algorithm to precisely adjust the installing position of the girder.

The bridge pier 10 is a reinforced concrete structure constructed on site to support the bridge.

A girder 20 is installed between two bridge piers 10, and the girder 20 is a steel frame or reinforced concrete structure to support a bridge top plate. The girder 20 may be a precast concrete structure manufactured in advance in a factory. A size of the girder 20 may be formed in various ways according to a site situation and a design shape of the bridge. For example, the girder 20 may have a length of about 50 m and a weight of about 150 tons.

As illustrated in FIG. 2, the connection plate 120 may be detachably coupled to both ends of the top surface of the girder 20. On the top surface of the connection plate 120, the cable connecting portion 121 in the form of a ring to which a cable 112 of a crane 110 is connected may be integrally formed. A side portion of the connection plate 120 may include four link connecting portions 124 to which links of the hydraulic robot 130 are rotatably coupled.

The crane 110 is a mobile crane with a built-in prime mover, and may include a plurality of outriggers, a telescoping boom, a hydraulic cylinder for adjusting an inclination angle of the boom, and the cable 112 wound by a winch, that is, a hoist line. In the present disclosure, two cranes 110 can lift one girder 20.

A pair of hydraulic robots 130 are symmetrically connected to each other on both sides of the connection plate 120 to move the girder 20 in the horizontal and vertical directions. Accordingly, four hydraulic robots 130 may be installed to precisely control the installing position of one girder 20.

The hydraulic system 200 (see FIG. 7) can control the actuators of four hydraulic robots 130 to precisely control the installing position of the girder 20. The specific configuration of the hydraulic system 200 will be described later.

As illustrated in FIGS. 3 and 4, the hydraulic robot 130 may include a first horizontal actuator 133 configured to move a first driving link 134 rotatably coupled to one side surface of the connection plate 120, a second horizontal actuator 135 configured to move a second driving link 136 rotatably coupled to one side surface of the connection plate 120 and rotatably connected to a side surface of the first horizontal actuator 133, a vertical actuator 137 coupled to one end of the first horizontal actuator 133 and moving up and down, and a vertical shaft 132 configured to guide an up-down movement of the vertical actuator 137, and a support 131 rotatably coupled to a lower end of the vertical shaft 132.

The support 131 may be fixedly installed on the top surface of the girder 20 by a portion of the weight of the girder 20. The support 131 may be formed in a circular shape.

The vertical shaft 132 may be freely rotatably installed on the support 131 in the direction of gravity to be supported. That is, the vertical shaft 132 may be freely rotated based on a z-axis in the center of the support 131, but may be installed so as not to move in an up-down direction.

The vertical actuator 137 may be installed on an outer peripheral surface of the vertical shaft 132 to move up and down. The vertical actuator 137 is formed in the shape of a square pipe, and can be driven up and down by a hydraulic cylinder provided between the vertical shaft 132 and the vertical actuator 137.

The first horizontal actuator 133 may be coupled to a side surface of the vertical actuator 137, and the first driving link 134 may be stretchably connected to an inner side thereof. The first horizontal actuator 133 may be formed in a rectangular pipe shape as a whole. The first driving link 134 is formed in a rectangular column shape so that one end can be inserted into the first horizontal actuator 133, and a connection end rotatably coupled to the link connecting portion 124 of the connection plate 120 may be integrally provided at the other end thereof.

One end of the second horizontal actuator 135 may be freely rotatably connected to one side surface of the first horizontal actuator 133 within a predetermined angle range. A middle portion of the second horizontal actuator 135 may be formed in a cylindrical shape. The second driving link 136 has one end in the form of a circular tube so that the outer peripheral surface of the second horizontal actuator 135 is inserted, and a connection end rotatably coupled to the link connecting portion 124 of the connection plate 120 may be integrally provided at the other end thereof.

The first horizontal actuator 133 and the second horizontal actuator 135 move the connection plate 120 and the girder 20 coupled thereto in the horizontal direction on an x-y plane, and the vertical actuator 137 can move the girder in a z-axis direction. As the first horizontal actuator 133 and the second horizontal actuator 135 are driven, the connection end of the first driving link 134, the connection end of the second driving link 136, and the vertical shaft 132 can be dependently rotated about the z-axis.

The four hydraulic robots 130 precisely control the installing position of the girder 20 with six degrees of freedom of movement in the x-axis, movement in the y-axis, yaw, movement in the z-axis, roll, and pitch.

As illustrated in FIG. 5, as the first horizontal actuator 133 and the second horizontal actuator 135 in the four hydraulic robots 130 move the two connection plates 120 in the horizontal direction, the girder 20 can be moved in three degrees of freedom of the movement in the x-axis, the movement in the y-axis, and a yaw motion such as rotation about the z-axis.

As illustrated in FIG. 6, as the vertical actuator 137 in the four hydraulic robots 130 moves the two connection plates 120 in the vertical direction, the girder 20 can be moved in three degrees of freedom of the movement in the z-axis, a roll motion such as rotation in the x-axis, and a pitch motion such as rotation about the y-axis.

Figure 7:
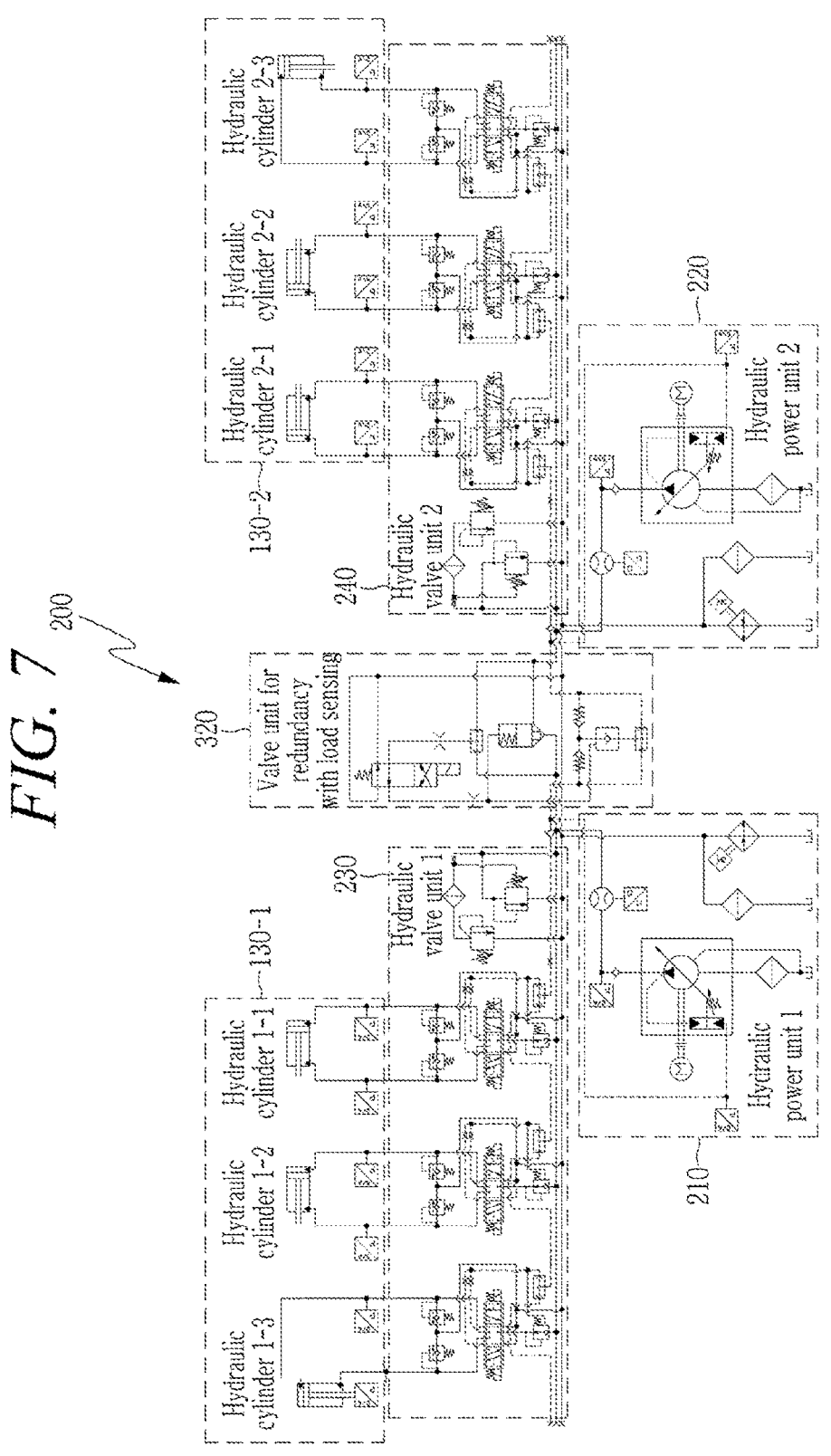
FIG. 7 is a circuit diagram illustrating a hydraulic system of a pair of hydraulic robots according to one embodiment of the present disclosure.
Figure 8:
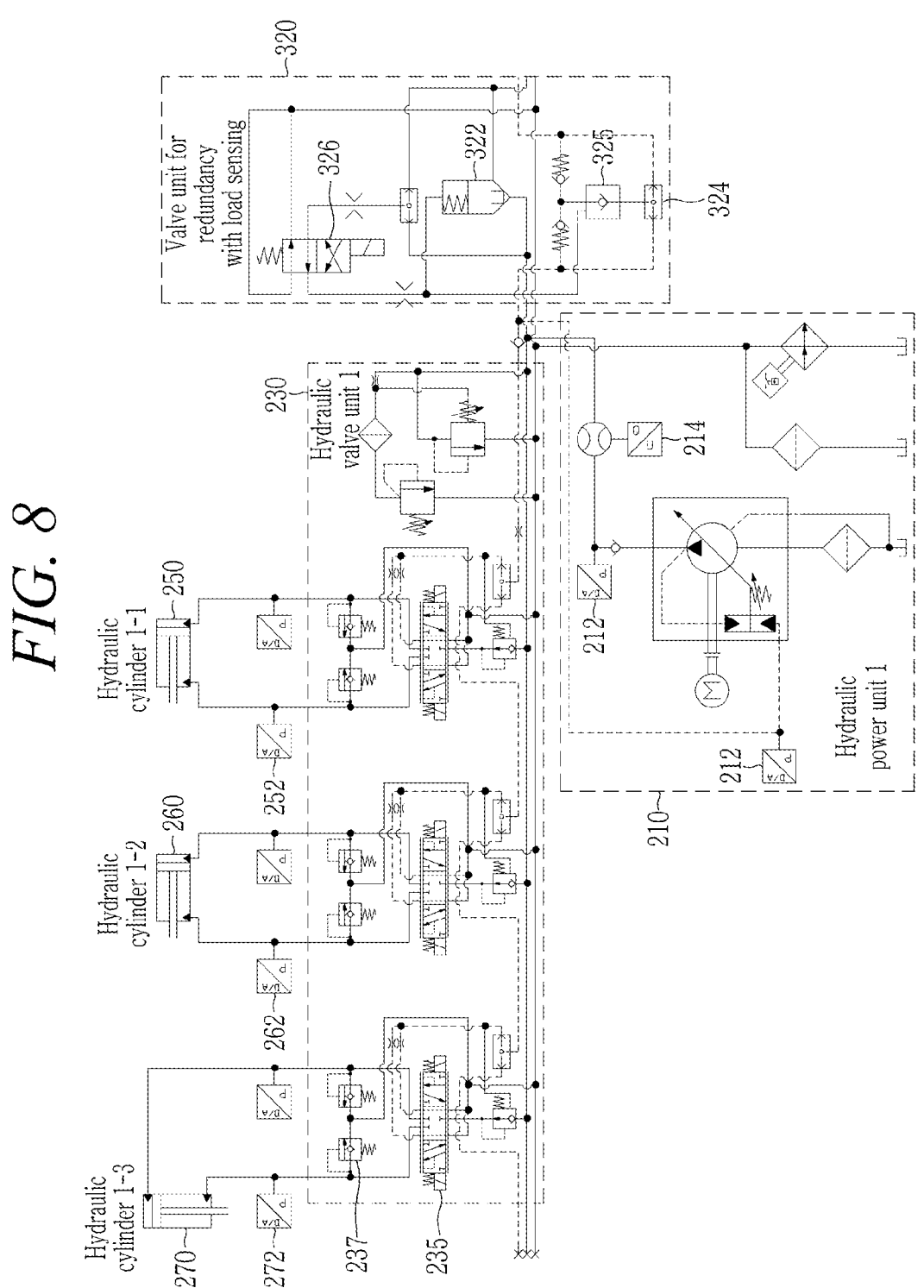
FIG. 8 is a circuit diagram illustrating a hydraulic system and a valve unit for redundancy with load sensing of a first (or third) hydraulic robot in FIG. 7.
Figure 9:
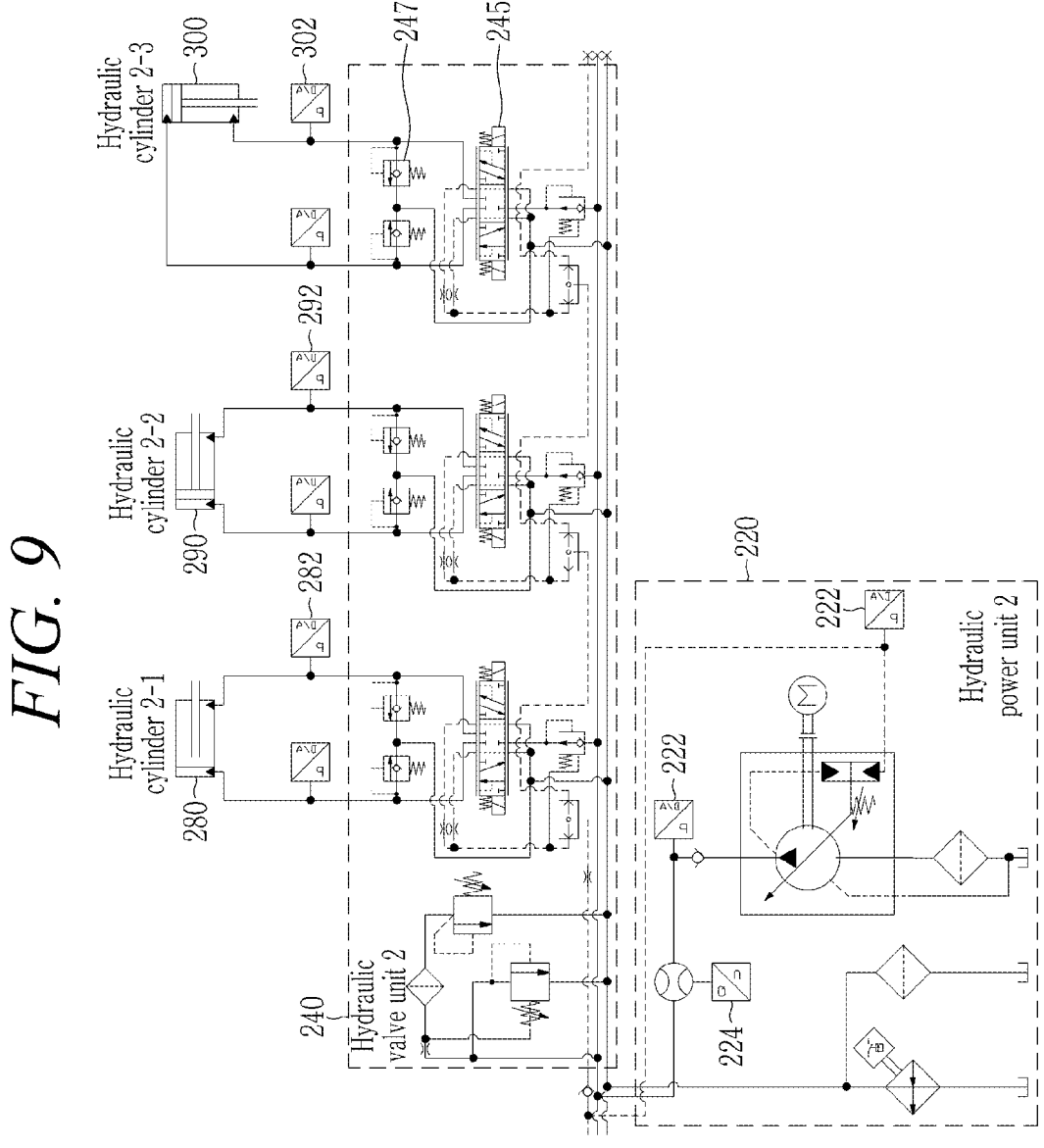
FIG. 9 is a circuit diagram illustrating a hydraulic system of a second (or fourth) hydraulic robot in FIG. 7.

FIG. 7 is a circuit diagram illustrating a hydraulic system of a pair of hydraulic robots according to one embodiment of the present disclosure, FIG. 8 is a circuit diagram illustrating a hydraulic system and a valve unit for redundancy with load sensing of a first (or third) hydraulic robot in FIG. 7, and FIG. 9 is a circuit diagram illustrating a hydraulic system of a second (or fourth) hydraulic robot in FIG. 7.

As illustrated in FIGS. 7 to 9, the hydraulic system 200 according to one embodiment of the present disclosure may include hydraulic power units 210 and 220 configured to supply a flow rate in the actuators of the hydraulic robot 130, hydraulic valve units 230 and 240 configured to individually supply flow rates to the actuators, and three hydraulic cylinders 250, 260, 270, 280, 290, and 300 individually connected to the hydraulic valve unit.

FIG. 7 illustrates the hydraulic system 200 controlling the fluid supply to a first (or third) hydraulic robot 130-1 and a second (or fourth) hydraulic robot 130-2. That is, the first hydraulic power unit 210 may supply fluid to the first (or third) hydraulic robot 130-1 through the first hydraulic valve unit 230, and the second (or fourth) hydraulic power unit 220 may supply fluid to the second hydraulic robot 130-2 through the second hydraulic valve unit 240.

As illustrated in FIG. 8, the first hydraulic power unit 210 includes a hydraulic motor and various valves, and thus, an incompressible fluid can be supplied to the actuators of the first (or third) hydraulic robot 130-1, that is, the hydraulic cylinders 250, 260, and 270 at a high pressure. The first hydraulic power unit 210 includes a pressure sensor 212 and a flow sensor 214 to control the flow by load sensing, that is, to control the hydraulic power unit according to the load. The pressure sensor 212 may measure the pressure of the fluid supplied by the hydraulic motor, and the flow sensor 214 may measure the flow rate of the fluid supplied.

As illustrated in FIG. 9, the second hydraulic power unit 220 also includes a hydraulic motor and various valves, and thus, an incompressible fluid can be supplied to the actuators of the second (or fourth) hydraulic robot 130-2, that is, the hydraulic cylinders 280, 290, and 300 at a high pressure. The second hydraulic power unit 220 includes a pressure sensor 222 and a flow sensor 224 to control the flow by load sensing, that is, to control the hydraulic power unit according to the load. The pressure sensor 222 may measure the pressure of the fluid supplied by the hydraulic motor, and the flow sensor 224 may measure the flow rate of the fluid supplied.

As illustrated in FIG. 8, the first hydraulic valve unit 230 may support a load sensing function for the working load of the actuators, and further include a solenoid-based proportional directional control valve 235 for precisely operating the actuator, and a relief valve 237 configured to protect the hydraulic cylinder against external force under high load conditions. The proportional directional control valve 235 is a precision solenoid-based 7/3 proportional directional control valve that can precisely control the hydraulic cylinder of each actuator. The relief valve 237 is a safety valve and can protect the system so that the pressure acting inside the hydraulic system does not rise above a predetermined pressure.

Pressure sensors 252, 262, and 272 are provided at inlet ends and outlet ends of the hydraulic cylinders 250, 260, and 270 of the first (or third) hydraulic robot 130-1, respectively, to detect a load applied to each hydraulic cylinder.

As illustrated in FIG. 9, the second hydraulic valve unit 240 may support a load sensing function for the working load of the actuators, and further include a solenoid-based proportional directional control valve 245 for precisely operating the actuator, and a relief valve 247 configured to protect the hydraulic cylinder against external force under high load conditions. The proportional directional control valve 245 is a precision solenoid-based 7/3 proportional directional control valve that can precisely control the hydraulic cylinder of each actuator. The relief valve 247 is a safety valve and can protect the system so that the pressure acting inside the hydraulic system does not rise above a predetermined pressure.

Pressure sensors 282, 292, and 302 are provided at inlet ends and outlet ends of the hydraulic cylinders 280, 290, and 300 of the second (or fourth) hydraulic robot 130-2, respectively, to detect a load applied to each hydraulic cylinder.

Preferably, a pair of hydraulic systems 200 of the present disclosure further includes a valve unit for redundancy with load sensing 320 connected between a pair of hydraulic valve units 230 and 240 and having a load sensing function. The valve unit for redundancy with load sensing 320 can be supplied with a hydraulic source by the hydraulic power unit of the other hydraulic system even when the hydraulic power unit of one hydraulic system fails, and by disabling the valve unit for redundancy with load sensing, it is possible to precisely control the plurality of hydraulic robots by minimizing the negative effects of the different load conditions of each hydraulic system.

As illustrated in FIG. 8, the valve unit for redundancy with load sensing 320 includes an ON/OFF poppet valve 322 connected to selectively share the hydraulic supply lines of the pair of hydraulic valve units 230 and 240, a directional control valve 326 configured to remotely activate or deactivate the redundancy function, and a shuttle valve 324 and a check valve 325 configured to selectively share the load sensing pressure.

The hydraulic lines of the hydraulic valve units are connected to each other between the ON/OFF poppet valves 322 so as to selectively share the hydraulic supply lines of the two hydraulic valve units 230 and 240. The ON/OFF poppet valve 322 may remotely connect or block hydraulic lines to each other through the directional control valve 326 for selective redundancy.

The solenoid-based 4/2 directional control valve 326 can be applied to remotely activate or deactivate the redundancy function. In addition, in order to selectively share the load sensing pressure between the two hydraulic valve units 230 and 240 by the 4/2 directional control valve 326, a circuit including the shuttle valve 324 and the check valve 325 may be applied.

When the valve unit for redundancy with load sensing 320 is applied, even when one hydraulic valve unit fails, the hydraulic cylinder in the connected hydraulic system can be driven by supplying flow through the other hydraulic valve unit. However, this redundancy function is shared only by two hydraulic valve units connected to one connection plate 120, and is not shared with two hydraulic valve units connected to the connection plate 120 located opposite to the girder.

Figure 10:
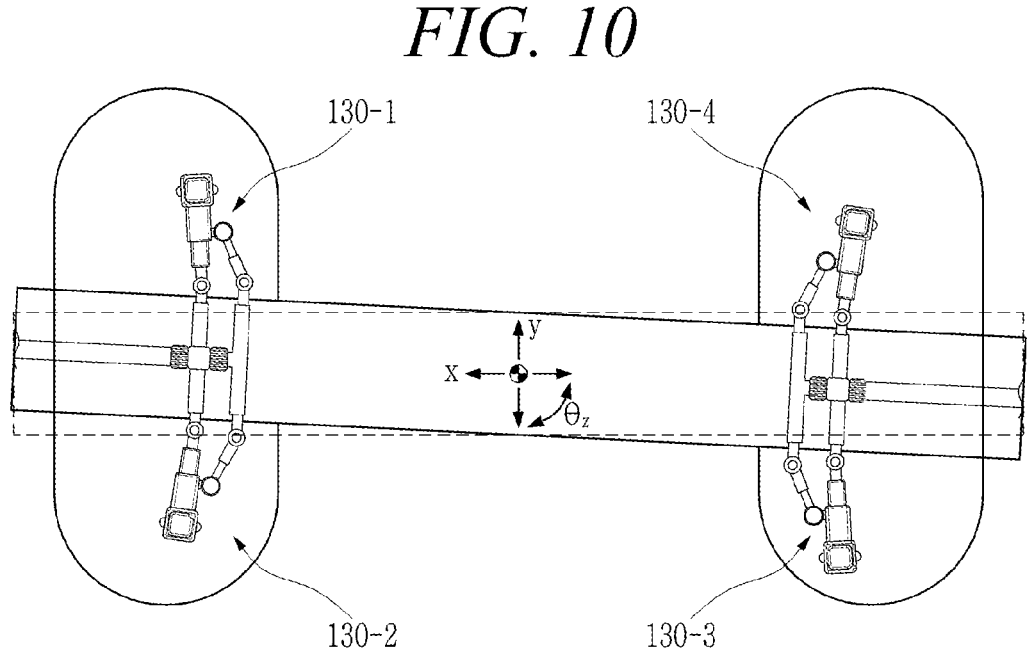
FIG. 10 is a schematic diagram illustrating moving a girder to a horizontal target position by four hydraulic robots.
Figure 11:
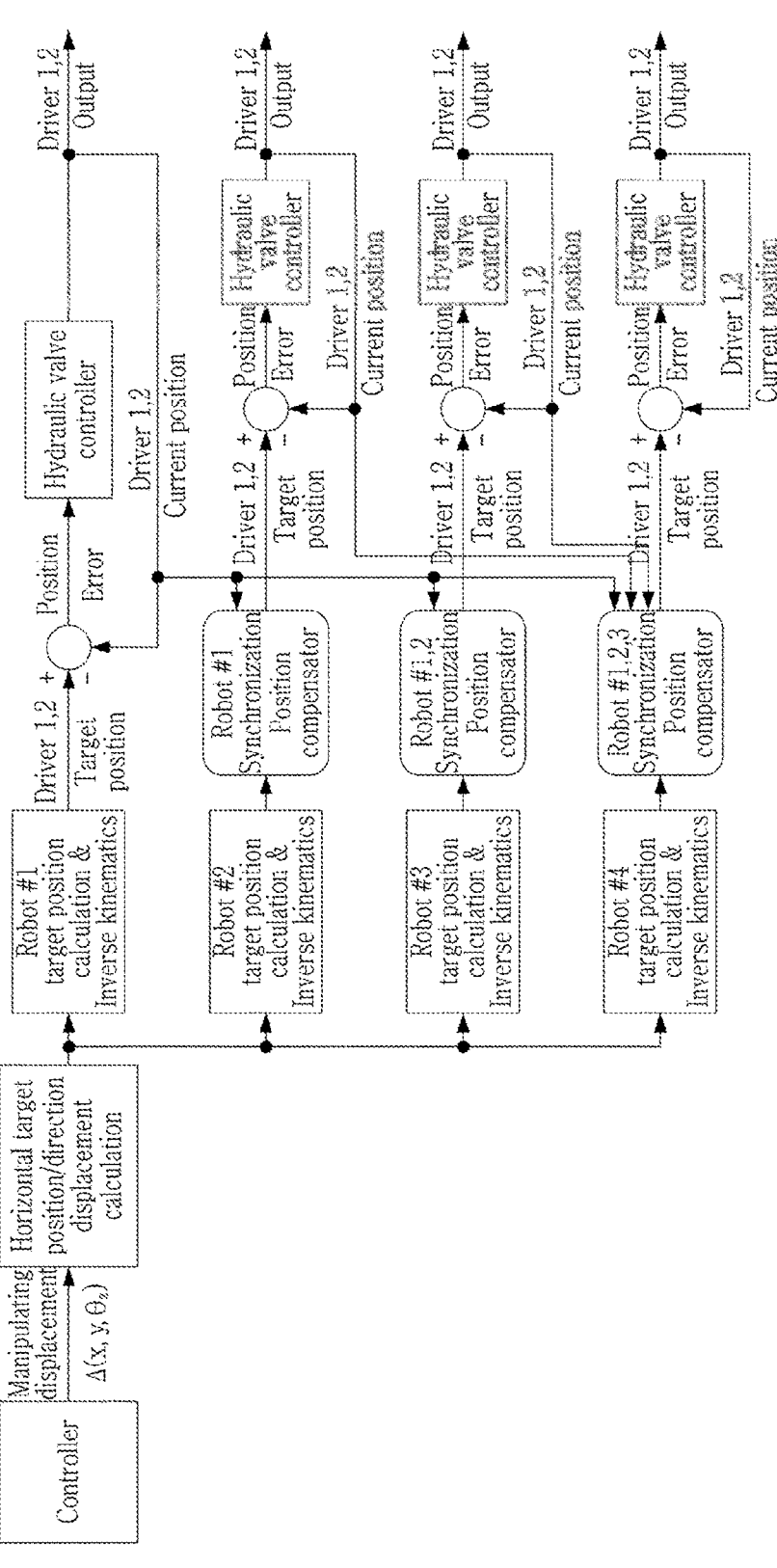
FIG. 11 is a control algorithm illustrating that each hydraulic robot synchronizes hydraulic robots by compensating for the robot position by receiving feedback on horizontal status information of other hydraulic robots.
Figure 12:
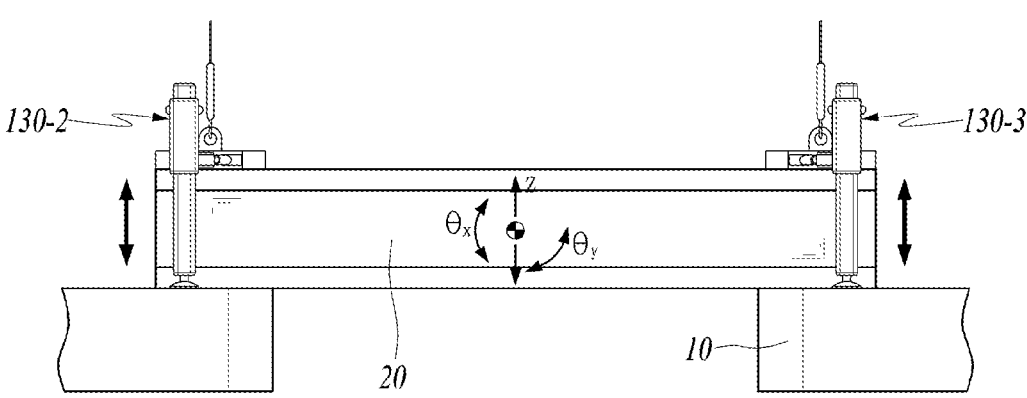
FIG. 12 is a schematic diagram illustrating the movement of a girder to a vertical target displacement by four hydraulic robots.
Figure 13:
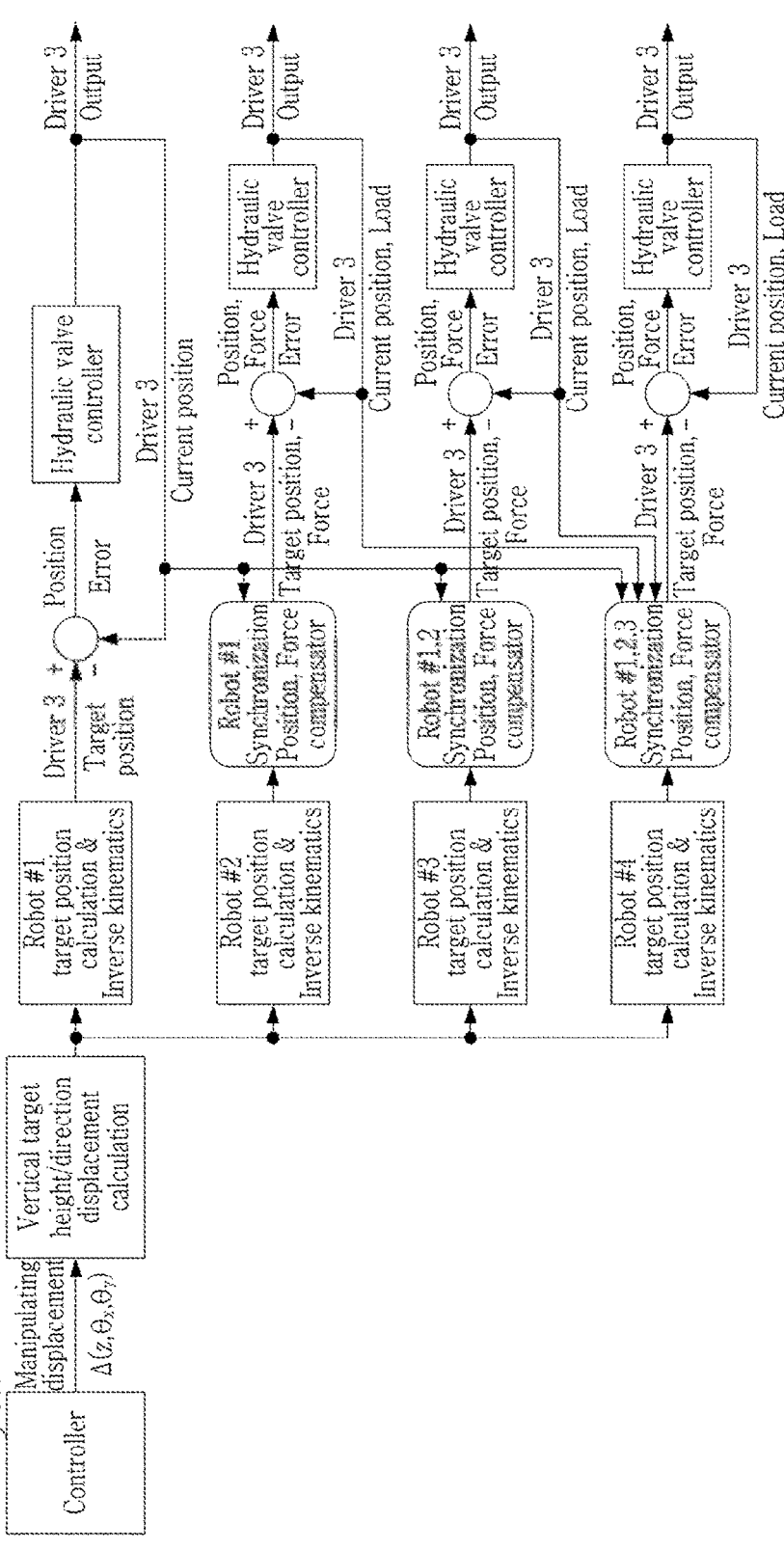
FIG. 13 is a control algorithm illustrating that each hydraulic robot synchronizes hydraulic robots by receiving feedback on vertical status information of other hydraulic robots and compensating for the robot position and force.

FIG. 10 is a schematic diagram illustrating moving the girder to the horizontal target position by the four hydraulic robots, FIG. 11 is a control algorithm illustrating that each hydraulic robot synchronizes hydraulic robots by compensating for the robot position by receiving feedback on horizontal status information of other hydraulic robots, FIG. 12 is a schematic diagram illustrating the movement of a girder to a vertical target displacement by four hydraulic robots, and FIG. 13 is a control algorithm illustrating that each hydraulic robot synchronizes hydraulic robots by receiving feedback on vertical status information of other hydraulic robots and compensating for the robot position and force.

The controller 350 of the present disclosure may include a horizontal controller configured to control displacements of x, y, and θz (=yaw) of the girder, and a vertical controller configured to control displacements of z, θx (=roll), and θy (=pitch) of the girder.

As illustrated in FIG. 10, the horizontal controller controls the first horizontal actuator 133 and the second horizontal actuator 135 of four hydraulic robots 130-1, 130-2, 130-3, and 130-4, respectively to move the girder 20 to the horizontal target position. That is, the horizontal controller can control the yaw (θz) displacement which moves the girder

20 along the x-axis, moves the girder along the y-axis, and rotates the girder about the z-axis.

As illustrated in FIG. 12, the vertical controller controls the vertical actuators 137 of the four hydraulic robots 130-1, 130-2, 130-3, and 130-4 to move the girder 20 to the vertical target position. That is, the vertical controller can control the pitch ($\theta$y) displacement which moves the girder 20 along the z-axis, rotates the girder about the x-axis ($\theta$x), and rotates the girder about the y-axis.

As illustrated in FIG. 11, in the horizontal controller, a controller of a first hydraulic robot (robot #1) may calculate control values for the first horizontal actuator (actuator 1) and the second horizontal actuator (actuator 2), a controller of a second hydraulic robot (robot #2) may receive status information of the first hydraulic robot as feedback and compensate for the robot position for synchronization to calculate control values for the first horizontal actuator and the second horizontal actuator, a controller of a third hydraulic robot (robot #3) may receive the status information of the first hydraulic robot and the second hydraulic robot as feedback and compensate for the robot position for synchronization to calculate control values for the first horizontal actuator and the second horizontal actuator, and a controller of a fourth hydraulic robot (#4) may receive the status information of the first hydraulic robot, the second hydraulic robot, and the third hydraulic robot as feedback and compensate for the robot position for synchronization to calculate the control values for the first horizontal actuator and the second horizontal actuator.

In order to precisely move one girder with four hydraulic robots, the controller 350 can apply a synchronization control algorithm in the horizontal and vertical directions. That is, the controller 350 may be a horizontal controller or a vertical controller. According to this algorithm, it is possible to automatically control four robots depending on the location and movement information of the girder operated by one worker at a remote location. The synchronization control algorithm designates the priority of the robot and can control the next robot sequentially according to the status of the robot with a relatively high priority.

The horizontal controller is responsible for the horizontal position and orientation of the girder to precisely move the girder to the targeted installing position. By receiving the displacement information of x, y, and $\theta$z (=yaw) of the girder transmitted through the manipulator from a remote location, the controller of the robot with the highest priority can calculate the control values for actuators 1 and 2 first. When the target position of the robot is calculated, the control values of the actuators 1 and 2 may be calculated by inverse kinematics. When the target positions of actuators 1 and 2 are input, the hydraulic valve controller drives actuators 1 and 2 to move the actuators to each target positions, and provides feedback control of the current positions of actuators 1 and 2 to compensate for position error, and thus, can perform precise control. In addition, it is possible to calculate the control values for the actuators 1 and 2 by receiving feedback on status information of a robot having a relatively high priority rank step by step according to the priority rank and compensating for the position of the robot for synchronization.

As illustrated in FIG. 13, in the vertical controller, the controller of the first hydraulic robot (robot #1) may calculate a control value for the vertical actuator (actuator 3), the controller of the second hydraulic robot (robot #2) may receive status information of the first hydraulic robot as feedback and compensate for the robot position and force for synchronization to calculate the control value for the vertical actuator, the controller of the third hydraulic robot (#3) may receive status information of the first hydraulic robot and the second hydraulic robot as feedback and compensate for the robot position and force for synchronization to calculate the control value for the vertical actuator, and the controller of the fourth hydraulic robot (robot #4) may receive the status information of the first hydraulic robot, the second hydraulic robot, and the third hydraulic robot as feedback and compensate for the robot position and force for synchronization to calculate a control value for the vertical actuator.

The vertical controller is responsible for stably maintaining the height and posture of the girder until the girder is seated on the bridge pier. By receiving the displacement information of z, $\theta$x (=roll), and $\theta$y (=pitch) of the girder transmitted through the manipulator from a remote location, the controller of the robot with the highest priority can calculate the control value for the actuator 3 first. When the target position of the robot is calculated, the control value of the actuator 3 may be calculated by inverse kinematics. When the target position of actuator 3 is input, the hydraulic valve controller drives the actuator 3 to move the actuator to the target position, and provides feedback control of the current positions of the actuator 3 to compensate for position error, and thus, can perform precise control. In addition, it is possible to calculate the control value for the actuator 3 by receiving feedback on status information of a robot having a relatively high priority rank step by step according to the priority rank and compensating for the position of the robot for synchronization. Here, the vertical controller is different from the horizontal controller in that in the case of the vertical controller, the position and force are controlled at the same time because the control has to be performed while handling the load caused by the high weight girder.

The hydraulic system of the present disclosure allows more precise control of the hydraulic robot by compensating for the robot position and force for synchronization with feedback of status information of other hydraulic robots when controlling the actuators of each hydraulic robot.

As described above, one embodiment of present disclosure has been described, but those of ordinary skill in the art will be able to variously modify and change the present disclosure by adding, changing, deleting, or adding components within the scope that does not depart from the spirit of the present disclosure described in the claims, these will also be said to be included within the scope of the right of present disclosure.

What is claimed is:

1. A multiple hydraulic robot system for installing a girder, the multiple hydraulic robot system comprising:
   four hydraulic robots connected to both sides of two connection plates which are coupled to both ends of a top surface of a girder installed between bridge piers and to which cables of a crane are connected, two of the four hydraulic robots forming a pair and the robots moving the girder horizontally and vertically;
   a hydraulic system configured to operate actuators of the four hydraulic robots; and
   a controller configured to control the remotely operated four hydraulic robots by means of a synchronization control algorithm to adjust the installing position of the girder.

2. The multiple hydraulic robot system of claim 1, wherein the hydraulic robot includes
   a first horizontal actuator configured to move a first driving link rotatably coupled to one side of the connection plate, a second horizontal actuator configured to move a second driving link rotatably coupled to one side of the connection plate and rotatably connected to a side surface of the first horizontal actuator, a vertical actuator coupled to one end of the first horizontal actuator and moving up and down, a vertical shaft configured to guide an up-down movement of the vertical actuator, and a support rotatably coupled to a lower end of the vertical shaft.

3. The multiple hydraulic robot system of claim 2, wherein the four hydraulic robots control the installing position of the girder with six degrees of freedom of movement in an x-axis, movement in a y-axis, yaw, movement in a z-axis, roll, and pitch.

4. The multiple hydraulic robot system of claim 3, wherein the hydraulic system includes a hydraulic power unit configured to supply a flow rate in the hydraulic system, a hydraulic valve unit configured to individually supply flow rates to the actuators, and three hydraulic cylinders individually connected to the hydraulic valve unit.

5. The multiple hydraulic robot system of claim 4, wherein the hydraulic power unit includes a pressure sensor and a flow sensor to have a flow control function by load sensing.

6. The multiple hydraulic robot system of claim 5, wherein the hydraulic valve unit supports a load sensing function for loads of actuators, and further includes a solenoid-based proportional directional control valve for operating the actuator, and a relief valve configured to protect the hydraulic cylinder against external force under high load conditions.

7. The multiple hydraulic robot system of claim 6, wherein in the hydraulic system, two systems form a pair, and the hydraulic system further includes a valve unit for redundancy with load sensing connected between the pair of hydraulic valve units.

8. The multiple hydraulic robot system of claim 7, wherein the valve unit for redundancy with load sensing includes an ON/OFF poppet valve connected to selectively share hydraulic supply lines of the pair of hydraulic valve units, a directional control valve configured to remotely activate or deactivate a redundancy function, and a shuttle valve and a check valve configured to selectively share a load sensing pressure according to ON/OFF of the ON/OFF poppet valve.

9. The multiple hydraulic robot system of claim 4, wherein the controller includes a horizontal controller configured to control displacements of x, y, and $\theta z$ ($=$yaw) of the girder, and a vertical controller configured to control displacements of z, $\theta x$ ($=$roll), and $\theta y$ ($=$pitch) of the girder.

10. The multiple hydraulic robot system of claim 9, wherein in the horizontal controller, a controller of a first hydraulic robot calculates control values for the first horizontal actuator and the second horizontal actuator, a controller of a second hydraulic robot receives status information of the first hydraulic robot as feedback and compensates for the robot position for synchronization to calculate control values for the first horizontal actuator and the second horizontal actuator, a controller of a third hydraulic robot receives the status information of the first hydraulic robot and the second hydraulic robot as feedback and compensates for the robot position for synchronization to calculate control values for the first horizontal actuator and the second horizontal actuator, and a controller of a fourth hydraulic robot receives the status information of the first hydraulic robot, the second hydraulic robot, and the third hydraulic robot as feedback and compensates for the robot position for synchronization to calculate the control values for the first horizontal actuator and the second horizontal actuator.

11. The multiple hydraulic robot system of claim 9, wherein in the vertical controller, a controller of a first hydraulic robot calculates a control value for the vertical actuator, a controller of a second hydraulic robot receives status information of the first hydraulic robot as feedback and compensates for the robot position and force for synchronization to calculate the control value for the vertical actuator, a controller of a third hydraulic robot receives status information of the first hydraulic robot and the second hydraulic robot as feedback and compensates for the robot position and force for synchronization to calculate the control value for the vertical actuator, and a controller of a fourth hydraulic robot receives the status information of the first hydraulic robot, the second hydraulic robot, and the third hydraulic robot as feedback and compensates for the robot position and force for synchronization to calculate a control value for the vertical actuator.

\* \* \* \* \*